(12) United States Patent
Smatloch et al.

(10) Patent No.: US 7,185,490 B2
(45) Date of Patent: Mar. 6, 2007

(54) ARRANGEMENT FOR SECURELY MOUNTING AN EXHAUST MANIFOLD TO THE CYLINDER HEAD OF AN INTERNAL COMBUSTION ENGINE

(75) Inventors: Christian Smatloch, Paderborn (DE); Wilfried Rostek, Paderborn (DE); Graham Bush, Troy, MI (US)

(73) Assignee: Benteler Automobil Technik GmbH, Paderborn (DE)

( * ) Notice: Subject to any disclaimer, the term of this patent is extended or adjusted under 35 U.S.C. 154(b) by 20 days.

(21) Appl. No.: 11/069,892

(22) Filed: Feb. 28, 2005

(65) Prior Publication Data

US 2005/0268602 A1 Dec. 8, 2005

(30) Foreign Application Priority Data

Mar. 5, 2004 (DE) .................. 10 2004 010 815

(51) Int. Cl.
*F01N 7/10* (2006.01)

(52) U.S. Cl. ............................. 60/323; 60/272; 60/274; 60/322; 285/124.1; 285/124.3; 285/206; 285/420; 277/591; 277/593

(58) Field of Classification Search ................. 60/272, 60/274, 282, 322, 323; 285/124.1, 124.2, 285/124.3, 205, 206, 212, 360, 376, 420; 277/591, 592, 593, 594
See application file for complete search history.

(56) References Cited

U.S. PATENT DOCUMENTS

| 5,636,515 A * | 6/1997 | Matsumoto et al. .......... 60/323 |
| 5,829,794 A * | 11/1998 | Schulz-Hausmann et al. ........................ 285/205 |
| 5,918,912 A * | 7/1999 | Keifel et al. ............. 285/124.1 |
| 6,155,046 A * | 12/2000 | Kato et al. .................... 60/323 |
| 6,702,062 B2 * | 3/2004 | Kusabiraki et al. ......... 181/240 |
| 6,789,386 B1 * | 9/2004 | Haerle ......................... 60/323 |

FOREIGN PATENT DOCUMENTS

| DE | 30 05 813 A1 | 9/1981 |
| DE | 44 30 339 A1 | 2/1996 |
| DE | 196 53 908 A1 | 6/1998 |

* cited by examiner

*Primary Examiner*—Binh Q. Tran
(74) *Attorney, Agent, or Firm*—Henry M. Feiereisen (57) ABSTRACT

An exhaust manifold has a head flange constructed for receiving at least two exhaust pipes arranged side-by-side, and includes spaced apart first and second longitudinal flange portions. A mounting assembly is provided for sealingly securing the exhaust manifold to a cylinder head of an internal combustion engine and includes a mounting rail formed with a shoulder which laps over the first longitudinal flange portion and contacts the first longitudinal flange portion in a spring-elastic manner. Plural screw fasteners at least indirectly clamp the second longitudinal flange portion to the cylinder head.

36 Claims, 4 Drawing Sheets

ARRANGEMENT FOR SECURELY MOUNTING AN EXHAUST MANIFOLD TO THE CYLINDER HEAD OF AN INTERNAL COMBUSTION ENGINE

CROSS-REFERENCES TO RELATED APPLICATIONS

This application claims the priority of German Patent Application Serial No. 10 2004 010 815.3 filed Mar. 5, 2004, the subject matter of which is incorporated herein by reference.

BACKGROUND OF THE INVENTION

The invention relates, in general, to an arrangement for secure and sealed mounting of a head flange of an exhaust manifold to a cylinder head of an internal combustion engine.

German patent publication no. DE 44 30339 A1 describes an arrangement of this type, whereby a comparably thick head flange is provided with a number of openings in side-by-side disposition for receiving exhaust pipes. Both longitudinal edges of the head flange are provided with tongues that extend transversely. The tongues engage gaps in a clamping rail and a tension rail. Both, the clamping rail and the tension rail are fastened to the top surface of the cylinder head by several screw fasteners. After both rails are secured, the head flange can be form-fittingly joined to the clamping rail by tilting it about its central longitudinal plane and to the tension rail by moving it downwards so that the head flange rests on the top surface of the cylinder head after a seal is placed therebetween.

A number of clamping screws are rotatably supported in the tension rail. The longitudinal axes of the clamping screws extend at an angle relative to the top surface of the cylinder head. The end surfaces of the clamping screws interact with slanted surfaces on the tongues that are joined with the tension rail. As the clamping screws are tightened, the head flange can be fixed in place, whereby single projections on the clamping rail extend over the end regions of the head flange.

The particular configuration of the head flange, the clamping rail and the tension rail are difficult to manufacture. Moreover, when tensioning the clamping screws, the slanted surfaces on the tongues of the head flange subject the structure to high stress forces, when the clamping screws are tightened. In view of the present high operating temperatures which these components of the exhaust system are exposed to, the tension forces are quickly dissipated through creeping processes. As a result, leakage occurs after only a short period of time. This problem is further compounded by the spotwise attack of the clamping screws.

It would therefore be desirable and advantageous to provide an improved securement of the head flange of an exhaust manifold to a cylinder head of an internal combustion engine, to obviate prior art shortcomings and to allow easy manufacture while still being reliable in operation and not prone to leakage.

SUMMARY OF THE INVENTION

According to one aspect of the present invention, a combination includes an exhaust manifold has a head flange constructed for receiving at least two exhaust pipes arranged side-by-side, and spaced apart first and second longitudinal flange portions, a mounting assembly for sealingly securing the exhaust manifold to a cylinder head of an internal combustion engine, with the mounting assembly including a mounting rail constructed to lap over the first longitudinal flange portion of the head flange and contacting the first longitudinal flange portion in a spring-elastic manner, and plural screw fasteners for at least indirectly clamping the second longitudinal flange portion to the cylinder head, and a seal arranged between the head flange and the cylinder head.

The present invention resolves prior art problems by providing a simple plug-type connection between the first longitudinal flange portion of the head flange and the mounting rail which has been secured beforehand to the top surface of the cylinder head. This type of connection can easily be realized with little application of force by simply sliding the head flange, while inclined relative to the top surface of the cylinder head, underneath the shoulder of the mounting rail. As a result of spring elastic contact between the first longitudinal flange portion and the shoulder of the mounting rail, the head flange, after placement of the seal, can then be pivoted in the direction toward the top surface of the cylinder head, thereby applying an increase tension force, without requiring the use of special screw means. Subsequently, the second longitudinal flange portion is firmly secured to the top surface of the cylinder head by screw fasteners under deformation of the seal.

Exhaust pipes of the exhaust manifold can now be configured in an optimum manner with respect to flow dynamics. As a consequence of these gas-dynamic advantages, the exhaust counterpressure and thus fuel consumption can be significantly reduced. This in turn leads also to longer life. Uniform wall thicknesses without any indents can be manufactured so that the presence of changes in stiffness and thus stress peaks can be eliminated when the exhaust pipes are subjected to a very high operating temperature. Furthermore, the service life of the exhaust manifold can be extended by the greater freedom of the head flange to shift under the mounting rail. Such a temperature-based shift relieves the exhaust pipes of excessive stress peaks and prolongs the life of the exhaust pipes.

The tightness of the overall combination of exhaust manifold, seal, and cylinder head, is substantially improved because the screw fasteners which are applied upon the second longitudinal flange portion impose a quasi linear load on the head flange, thereby evening out the distribution of stress on the seal. Another advantage involves the suitability of the head flange for application with several motor types, because there is no need to rigidly associate the head flange to a specific screw pattern. Thus, the need for clear screw holes for torque-applying tools is eliminated.

According to another feature of the present invention, the first longitudinal flange portion of the head flange may have an S-shape configuration, with the mounting rail having an L-shaped configuration with the shoulder disposed in substantial parallel relationship to a top surface of the cylinder head and lapping over the S-shaped first longitudinal flange portion, wherein the second -longitudinal flange portion of the head flange has a flat configuration and is formed with bores for direct securement of the second longitudinal flange portion to the cylinder head by means of the screw fasteners. The L-shaped mounting rail has a wide and stable attachment leg secured to the top surface of the cylinder head by screw bolts. Suitably, the head flange may be made from a sheet metal blank by a deep-drawing process and has a thickness which is significantly smaller than a thickness of the mounting rail. As a consequence of the S-shaped configuration, the first longitudinal flange portion can be easily inserted in the longitudinal gap between the shoulder of the L-shaped mounting rail and the top surface of the cylinder head, when the head flange is tilted. Suitably, the distance between the shoulder and the top surface is greater than the thickness of the head flange. After an end surface of the first longitudinal flange portion abuts against the attachment leg of the mounting rail, the head flange can be pivoted in the direction toward the top surface of the cylinder head. As a result, a convex area of the first longitudinal flange portion contacts the shoulder of the mounting rail, resulting in a spring-elastic clamping action of the first longitudinal flange portion between the shoulder and the top surface of the cylinder head, when the second longitudinal flange portion of the head flange is directly secured to the cylinder head by the screw fasteners.

According to another feature of the present invention, both the first and second longitudinal flanges portions may have each an S-shape configuration, wherein the mounting rail has an L-shaped configuration with a shoulder disposed in substantial parallel relationship to a top surface of the cylinder head and lapping over the S-shaped first longitudinal flange portion, and with the mounting assembly including a further L-shaped rail having a shoulder disposed in substantial parallel relationship to a top surface of the cylinder head and lapping over the S-shaped second longitudinal flange portion.

According to another feature of the present invention, both the first and second longitudinal flange portions of the head flange, which head flange is deep-drawn form a steel sheet plate, are configured with an S-shaped end portion. In that case, an L-shaped mounting rail is attached to the head cylinder on each side of the head flange and the S-shaped portion on each of the first and second longitudinal portions is overlapped by the respective shoulder of the mounting rail acting as a lug for the S-shaped portion for a spring-elastic contact. In this embodiment, the second longitudinal flange portion has the same width as the first longitudinal flange portion in the absence of any throughbores so that the contact between the shoulder of the mounting rail and the second longitudinal flange portion is also spring elastic. As a result, a convex area of the S-shaped portion of the second longitudinal flange portion contacts the top surface of the cylinder head or seal, while a further convex area of the second longitudinal flange portion contacts the shoulder of the mounting rail.

By deep-drawing the head flange from a steel sheet blank, the exhaust manifold may suitably have a plurality of collars provided between the first and second longitudinal flanges portions for receiving the exhaust pipes, whereby the collars and the exhaust pipes are placed in one-to-one correspondence. The exhaust pipes project into the collars and are secured by fillet welds between the end surfaces of the collars and outer surfaces of the exhaust pipes.

According to another feature of the present invention, the first longitudinal flange portion of the head flange has a planar configuration, with the mounting rail having an S-shape configuration and including a shoulder disposed in substantial parallel relationship to a top surface of the cylinder head and lapping over the first longitudinal flange portion, with the second longitudinal flange portion of the head flange having bores for receiving the screw fasteners for direct securement to the cylinder head. In this case, the head flange is stamped from a sheet metal blank and thus is fairly stiff, whereas the mounting rail is now elastically yielding to establish a screw-less clamping of the first longitudinal flange portion of the head flange between the mounting rail and the top surface of the cylinder head.

Suitably, the shoulder of the mounting rail is arched slightly convex in the direction of the top surface. This facilitates the insertion of the first longitudinal flange portion into the gap between the shoulder of the mounting rail and the top surface of the cylinder head, when the head flange is tilted during installation. When the end surface of the first longitudinal flange portion abuts the attachment leg of the mounting rail, the head flange is pushed downwards in the direction of the top surface of the cylinder head so that the second longitudinal flange portion is directly fixed in place upon the top surface of the cylinder head via the screw bolts, while at the same time the seal is compressed. Suitably, the thickness of the mounting rail corresponds here to about half the thickness of the head flange.

According to another feature of the present invention, the first longitudinal flange portion of the head flange may have a planar configuration, with the mounting rail having an S-shape configuration and including a shoulder disposed in substantial parallel relationship to a top surface of the cylinder head and lapping over the first longitudinal flange portion, with the mounting assembly including an S-shaped mounting rail having a shoulder disposed in substantial parallel relationship to a top surface of the cylinder head and lapping over the second longitudinal flange portion. The second longitudinal flange portion is thus not directly attached by screw fasteners to the top surface of the cylinder head but by means of another S-shaped configuration mounting rail. Suitably, the shoulder of the mounting rail is arched slightly convex to effect a spring elastic clamping of the second longitudinal flange portion of the head flange.

According to another feature of the present invention, the exhaust manifold may have a plurality of openings provided between the first and second longitudinal flanges portions for receiving the exhaust pipes, whereby the openings and the exhaust pipes are placed in one-to-one correspondence. The exhaust pipes project into the openings, with their end surfaces welded to inner surfaces of the opening.

According to another feature of the present invention, the seal between the head flange and the top surface of the cylinder head may be a single layer gasket or a multi-layer gasket.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
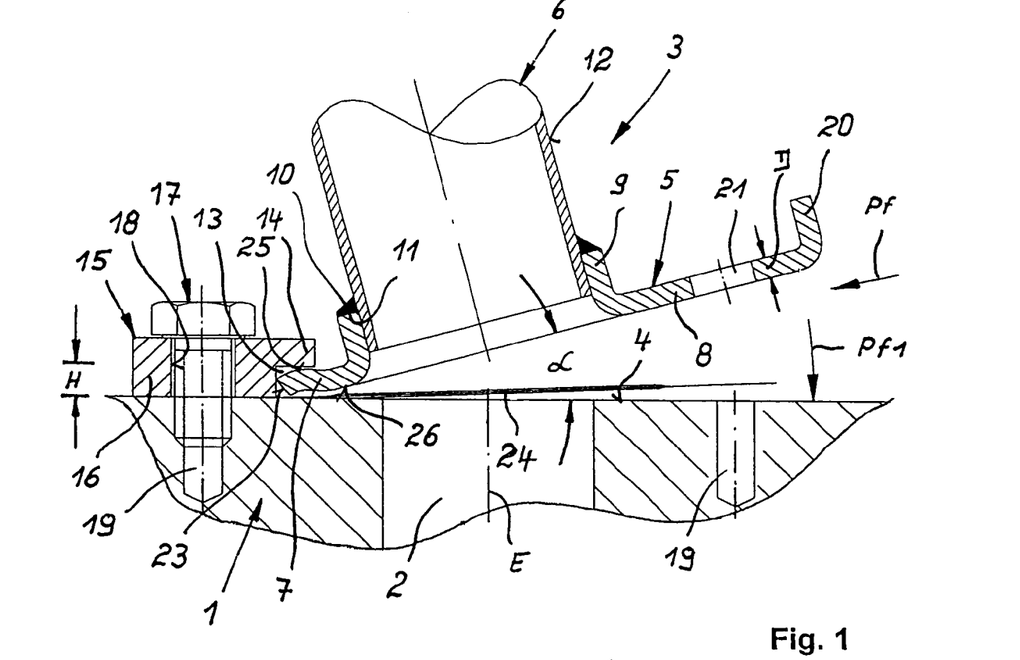
FIG. 1 is a schematic vertical portion of a first embodiment of an arrangement a cylinder head and exhaust manifold, embodying the subject matter of the present invention, during assembly.

Turning now to the drawing, and in particular to FIG. 1, there is shown a schematic vertical portion of a cylinder head, generally designated by reference numeral 1, of an internal combustion engine which is not shown here in more detail. The cylinder head 1 is provided with at least two cylinders which are arranged side-by-side and have exhaust ducts 2 oriented in a common longitudinal plane E. Secured to a top surface 4 of cylinder head 1 is an exhaust manifold, generally designated by reference numeral 3 and including a head flange 5, which is deep-drawn from a steel sheet blank, and exhaust pipes 6 of a number corresponding to a number of exhaust ducts 2 in cylinder head 1.

It is to be understood by persons skilled in the art that the term "exhaust manifold" is used here in a generic sense and is synonymous with the terms "exhaust elbow" or "exhaust collector".

The head flange 5 is provided with two longitudinal flange portions 7, 8, and a plurality of collars 9 formed between the longitudinal flange portions 7, 8 for receiving the exhaust pipes 6 in one-to-one correspondence, with each exhaust pipe 6 projecting into the associated collar 9. Each exhaust pipe 6 is connected to the head flange 5 via a fillet weld 10 which is applied between an outer surface 12 of the exhaust pipe 6 and an end surface 11 of the collar 9. FIG. 1 shows a state during installation of the exhaust manifold 3 to the cylinder head 1, whereby a stable L-shaped mounting rail 15 is used for securement onto the top surface 4 of the cylinder head 1 prior to installation of the exhaust manifold 3. The mounting rail 15 has an attachment leg 16 for securement upon the top surface 4 by screw bolts 17, and a shoulder 14 which juts out from the attachment leg 16 toward the head flange 5 in substantial parallel relationship to the top surface 4. The screw bolts 17 extend through bores 18 in the mounting rail 15 and threadably engage in threaded bores 19 of the cylinder head 1.

The longitudinal flange portion 7 of the head flange 5 has an S-shaped configuration to provide spring-elastic resiliency. The head flange 5, and thus also the longitudinal flange portion 7, has a thickness D which is smaller than a height H of a gap 13 defined between the shoulder 14 of the mounting rail 15 and the top surface 4 of the cylinder head 1.

The other longitudinal flange portion 8 of the head flange 5 has a planar configuration and ends in an inturned terminal edge 20 which extends perpendicular to the top surface 4 of the cylinder head 1. Bores 21 are provided in the longitudinal flange portion 8 for insertion of screw fasteners 22.

Installation of the exhaust manifold 3 to the cylinder head 1 is as follows: The head flange 5, fitted beforehand with the exhaust pipes 6, is placed at an angle a with respect to the top surface 4 of the cylinder head 1 and pushed in a direction indicated by arrow Pf until the longitudinal flange portion 7 of the head flange 5 is received in the gap 13 between the shoulder 14 and the top surface 4 of the cylinder head 1 and a front surface 23 of the longitudinal flange portion 7 rests against a confronting surface of the attachment leg 16. A gasket seal 24 is then placed between the exhaust manifold 3 and the top surface 4. Subsequently, the exhaust manifold 3 is pivoted in a direction of arrow Pf1 until resting upon the top surface 4. The exhaust manifold 3 is then secured by inserting the screw fasteners 22 through the bores 21 in the longitudinal flange portion 8 and tightening the screw fasteners 2 in the aligned threaded bores 19 in cylinder head 1. The assembled state is shown in FIG. 2.

Figure 2:
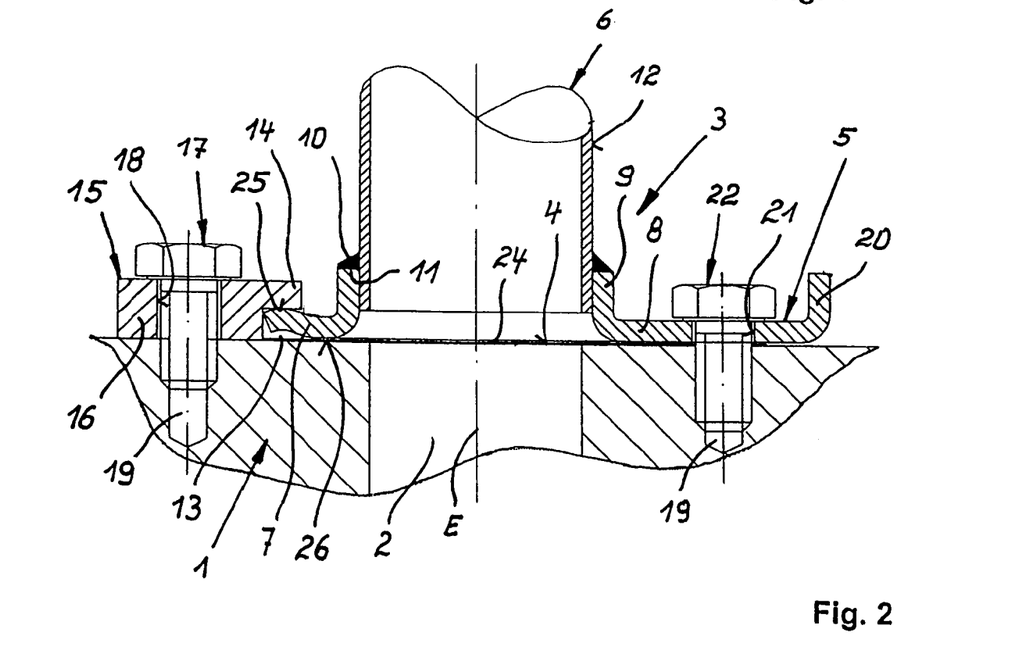
FIG. 2 is a schematic vertical portion of the arrangement of FIG. 1, after assembly.

As the head flange 5 is moved in the direction of arrow Pf1, an upper convex area 25 of the longitudinal flange portion 7 contacts an underside of the shoulder 14 of the mounting rail 15, and a lower convex area 26 of the longitudinal flange portion 7 contacts the top surface 4 and the gasket 24, respectively, as shown in FIG. 2. As a result of the downward movement of the head flange 5 and securement of the head flange 5 upon the top surface 4, the spring-elastic resiliency of the longitudinal flange portion 7 results in an increased clamping force, so that the exhaust manifold 3 with integrated gasket 24 is reliably and effectively secured to the top surface 4 of cylinder head 1.

Figure 3:
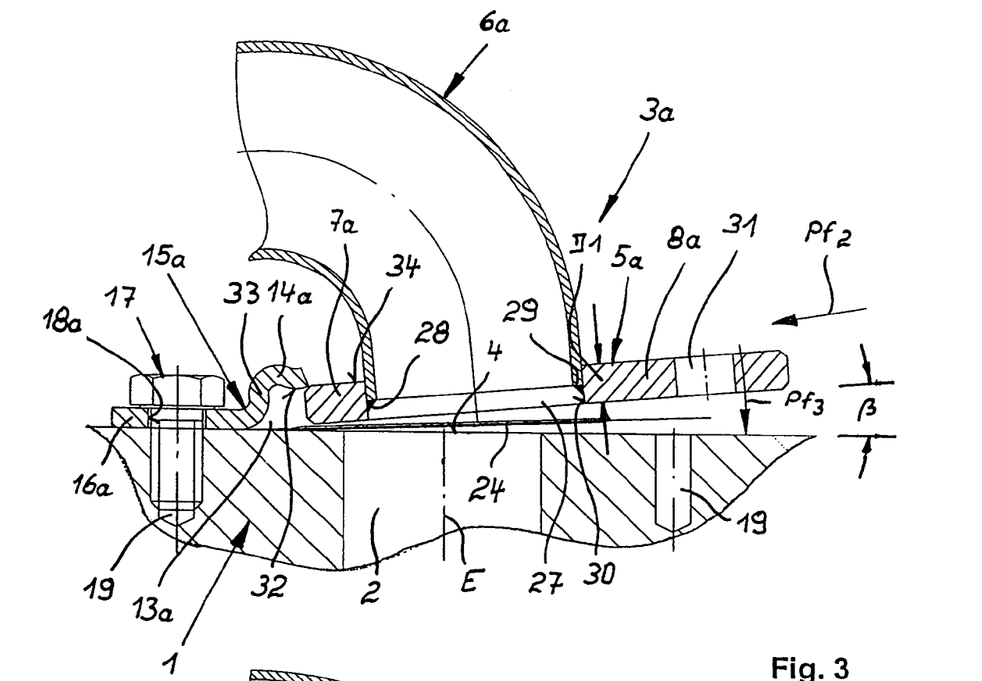
FIG. 3 is a schematic illustration of vertical portion of a second embodiment of an arrangement a cylinder head and exhaust manifold, embodying the subject matter of the present invention, during assembly.

Referring now to FIG. 3, there is shown another embodiment of the present invention. In the following description, parts corresponding with those in FIG. 1 will be identified by corresponding reference numerals followed by an "a". The exhaust manifold 3a includes a head flange 5a which is stamped from a planar sheet metal blank. This head flange 5a has a comparatively great thickness D1 and is provided with openings 27 in side-by-side disposition for receiving exhaust pipes 6a corresponding to the number of cylinders 2. Fillet welds 28 between end surfaces 29 of the exhaust pipes 6a and inner walls 30 of the openings 27 are made to secure the exhaust pipes 6a within head flange 5a.

The head flange 5a has a first longitudinal flange portion 7a and a comparatively wider second longitudinal flange portion 8a which is provided with boreholes 31 for receiving screw fasteners 22.

Prior to assembly of the exhaust manifold 3a, which comprises the head flange 5a and the exhaust pipes 6a, a mounting rail 15a, having an S-shaped configuration and an attachment leg 16a, is mounted to the top surface 4 of the cylinder head 1 by means of screw bolts 17. The screw bolts 17 extend through the boreholes 18a in the attachment leg 16a and threadably engage in threaded bores 19 in the cylinder head 1.

The mounting rail 15a includes a shoulder 14a which extends in substantially parallel relationship to the top surface 4 of the cylinder head 1 and has a convex area 32 arching downwards in the direction of the top surface 4. A web 33, which connects the attachment leg 16a and the shoulder 14a of the mounting rail 15a, imparts the shoulder 14a with a certain resilient elasticity in transverse direction to the top surface 4.

Figure 4:
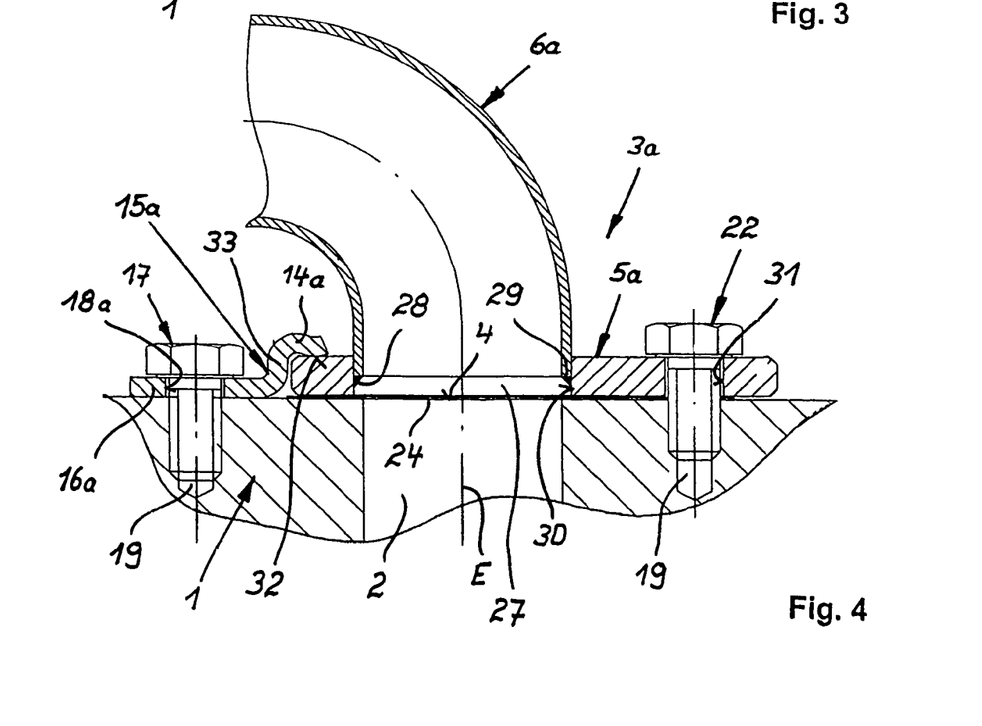
FIG. 4 shows the arrangement of FIG. 3 after assembly.

During assembly of the exhaust manifold 3a on the cylinder head 1, the mounting rail 15a is initially secured by means of the screw bolts 17 onto the top surface 4 of the cylinder head 1. After placement of the seal 24, the head flange 5a of the exhaust manifold 3a is pushed in the direction of arrow Pf2 at an angle β into the gap 13a between the shoulder 14a and the top surface 4 until impacting against the web 33 of the mounting rail 15a. The shoulder 14a deflects hereby slightly upwards and rest upon the top surface 34 of the first longitudinal flange portion 7a. Next, the head flange 5a is pivoted in downward direction toward the top surface 4, as indicated by arrow Pf3, so that the head flange 5a and thus also the exhaust manifold 3a is securely fixed to the top surface 4 of the cylinder head 1, while the seal 24 is compressed, when the screw fasteners 22 are inserted and tightened. The assembled arrangement of exhaust manifold 3a and cylinder head 1 is shown in FIG. 4

Figure 5:
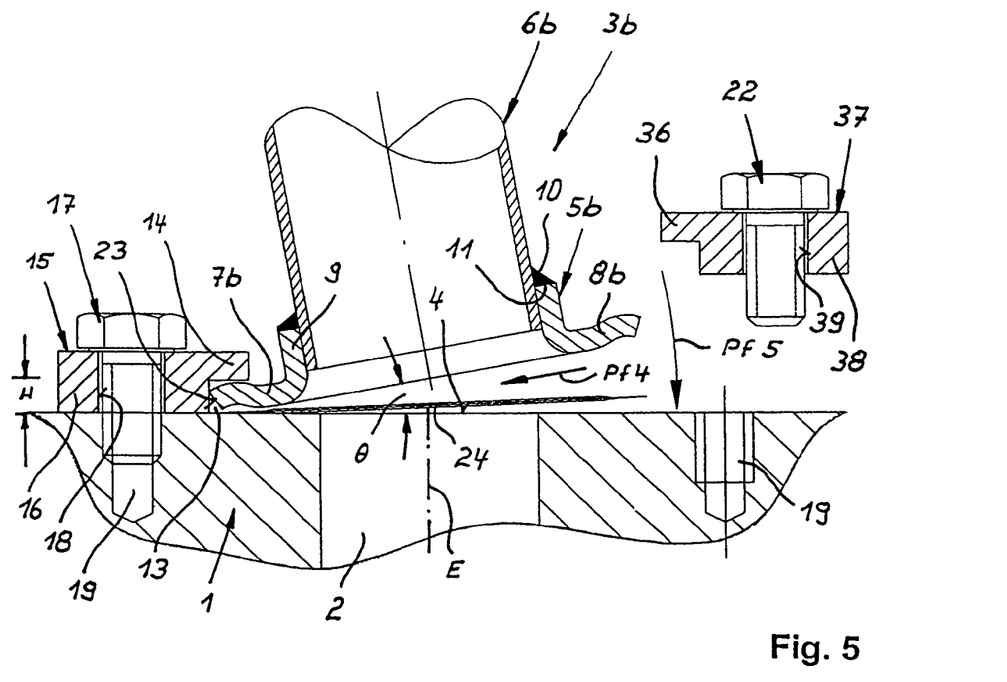
FIG. 5 is a schematic illustration of a vertical portion of a third embodiment of an arrangement a cylinder head and exhaust manifold, embodying the subject matter of the present invention, during assembly.

Referring now to FIG. 5, there is shown another embodiment of the present invention. In the following description, parts corresponding with those in FIG. 1 will be identified by corresponding reference numerals followed by a "b". The exhaust manifold 3b is secured to the top surface 4 of the cylinder head 1 and includes a head flange 5b, which is deep-drawn form a sheet metal blank, and exhaust pipes 6b at a number corresponding to a number of cylinders 2 in the cylinder head 1. The head flange 5b is provided between the longitudinal portions 7b, 8b with collars 9 for receiving the exhaust pipes 6b. The exhaust pipes 6b project into the collars 9. Fillet welds 10 between the end surfaces 11 of the collars 9 and the outer surfaces 12 of the exhaust pipes 6b secure the exhaust pipes 6b with the head flange 5b.

The longitudinal flange portion 7b has an S-shape configuration to provide a resilient elasticity. The head flange 5b, and thus also the longitudinal flange portion 7b, has a thickness D which is smaller than the height H of the gap 13 between the shoulder 14 and the top surface 4, wherein the shoulder 14 extends substantially parallel to the top surface 4 of the cylinder head 1 and is part of a stable L-shaped mounting rail 15. The attachment leg 16 of the mounting rail 15 is fastened by screw bolts 17 to the top surface 4 prior to assembly of the exhaust manifold 3b. The screw bolts 17 extend through boreholes 18 in the mounting rail 15 and are threadably engaged with threaded bores 19 in the cylinder head 1.

The second longitudinal flange portion 8b has also an S-shaped configuration to provide a resilient elasticity and interacts with a L-shaped stable mounting rail 37 having a shoulder 36 in parallel relationship to the top surface 4 of the cylinder head 1. The head flange 5b, and thus also the second longitudinal flange portion 8b, has a thickness D which is smaller than the height H of the gap 35 between the shoulder 36 of the mounting rail 37 and the top surface 4. The mounting rail 37 is attached with its attachment leg 38 to the top surface 4 by screw fasteners 22 which extend throughbore holes 39 in the mounting rail 37 and threadably engage threaded bores 19 into cylinder head 1.

Assembly of the exhaust manifold 3b is as follows: The exhaust manifold 3b, after fitted with the exhaust pipes 6b, is initially pushed with the longitudinal flange portion 7b of the head flange 5b at an angle θ in a direction of arrow Pf4 into the gap 13 between the shoulder 14 of the mounting rail 15 and the top surface 4 of the cylinder head 1 until the end surface 23 abuts against the attachment leg 16. After depositing the seal 24 between the exhaust manifold 3b and the top surface 4, the exhaust manifold 3b is pivoted downwards in a direction of arrow Pf5 onto the top surface 4, and the mounting rail 37 is then secured to the top surface 4 by the screw fasteners 22.

Figure 6:
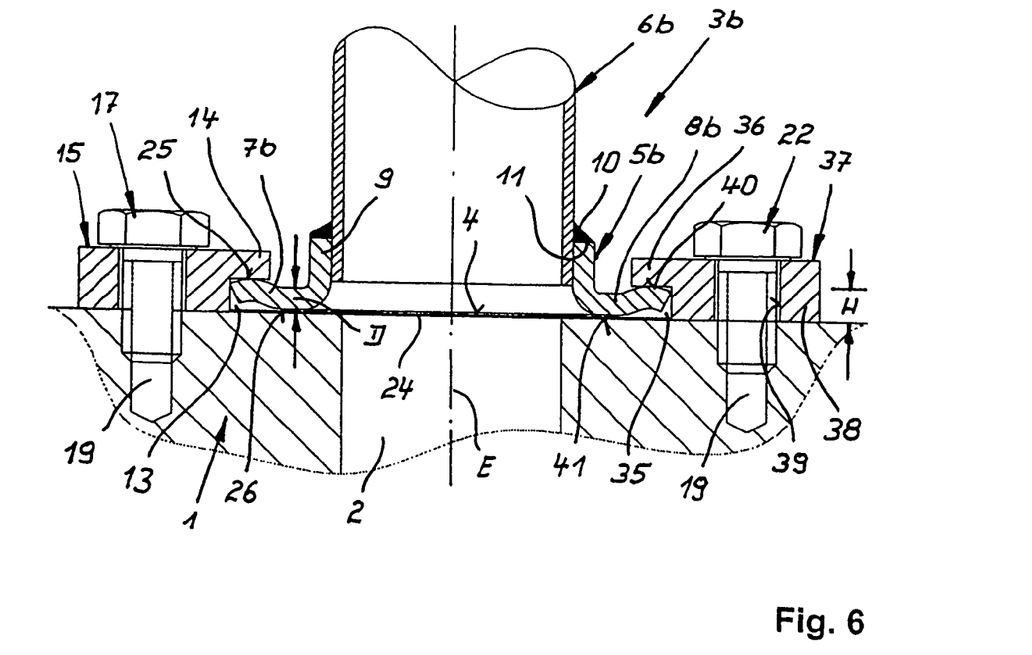
FIG. 6 shows the arrangement of FIG. 5 after assembly.

As the head flange 5b is moved in the direction of arrow Pf5, an upper convex area 25 of the longitudinal flange portion 7b contacts the shoulder 14 of the mounting rail 15, and a lower convex area 26 of the longitudinal flange portion 7b contacts the top surface 4 and the seal 24, as shown in FIG. 6. As a consequence of the downward movement of the head flange 5b and securement the head flange 5b to the top surface 4, an increased clamping force is applied as a consequence of the resilient elasticity of the longitudinal flange portion 7b. A clamping in spring elastic manner is also realized between the shoulder 36 of the mounting rail 37 and the longitudinal flange portion 8b, whereby the shoulder 36 rests upon an upper convex area 40 of the longitudinal flange portion 8b, while a lower convex area 41 of the longitudinal flange portion 8b rests upon the top surface 4 or seal 24.

Figure 7:
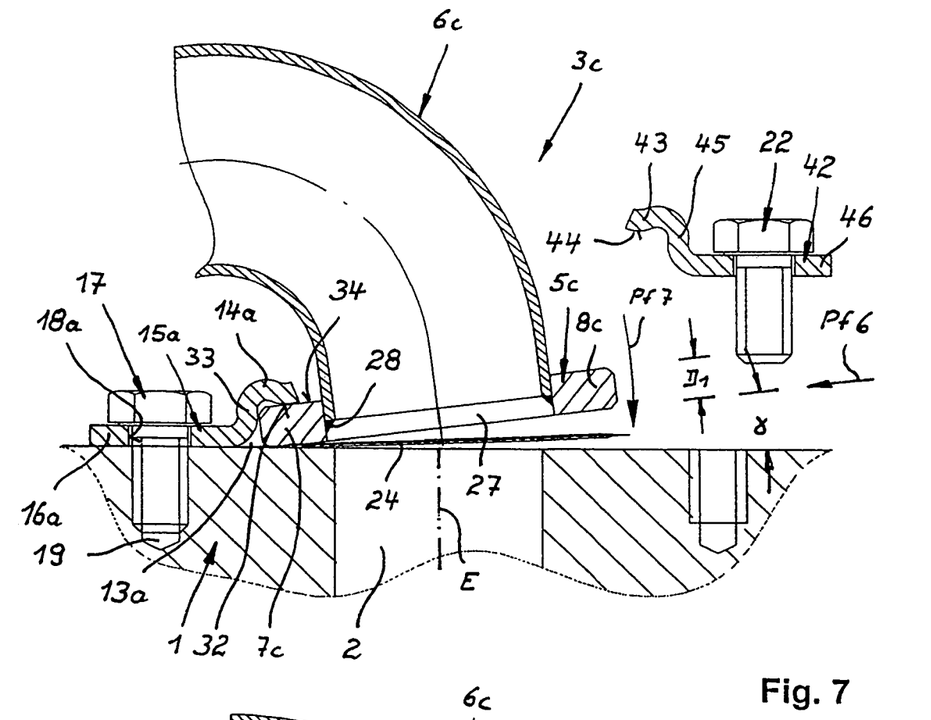
FIG. 7 is a schematic illustration of vertical portion of a fourth embodiment of an arrangement a cylinder head and exhaust manifold, embodying the subject matter of the present invention, during assembly.

Referring now to FIG. 7, there is shown another embodiment of the present invention. In the following description, parts corresponding with those in FIG. 1 will be identified by corresponding reference numerals followed by a "c". The exhaust manifold 3c has a head flange 5c which is stamped from a planar sheet metal blank and has a comparatively great thickness D1. The head flange 5c is provided with openings 27 in side-by-side disposition for receiving exhaust pipes 6a of a number corresponding to a number of cylinders 2. Fillet welds 28 between the end surfaces 29 of the exhaust pipes 6c and the inner walls 30 of openings 27 secure the exhaust pipes 6c within the head flange 5c. In this embodiment, the longitudinal flange portions 7c, 8c of the head flange 5c have a same width and are devoid of any boreholes.

Prior to assembly of the exhaust manifold 3c, comprised of head flange 5c and exhaust pipes 6c, a mounting rail 15a having an S-shape configuration similar to the embodiment of FIG. 3, and thus including a shoulder 14a and an attachment leg 16a, is secured to the top surface 4 of the cylinder head 1 by screw bolts 17. The screw bolts 17 extend through boreholes 18a in the attachment leg 16a and threadably engage threaded bores 19 in the cylinder head 1.

The shoulder 14a of the mounting rail 15a extends substantially parallel to the top surface 4 of the cylinder head 1 and is provided with a convex area 32 arching downwards in the direction of the top surface 4. A web 33, which connects the attachment leg 16a and the shoulder 14a of the mounting rail 15a, imparts the shoulder 14a with a certain resilient elasticity.

Assembly of the exhaust manifold 3c on the cylinder head 1 is as follows: The mounting rail 15a is first secured by the screw bolts 17 to the top surface 4 of the cylinder head 1. After depositing the seal 24, the head flange 5c of the exhaust manifold 3c is pushed at an angle γ in a direction of arrow Pf6 into the gap 13a between the shoulder 14a and the top surface 4 until abutting the web 33 of the mounting rail 15a (FIG. 7). As a result, the shoulder 14a deflects slightly upwards as it engages the top surface 34 of the longitudinal flange portion 7c. Thereafter, the head flange 5c is moved downwards in a direction of arrow Pf 7 onto the top surface 4.

Figure 8:
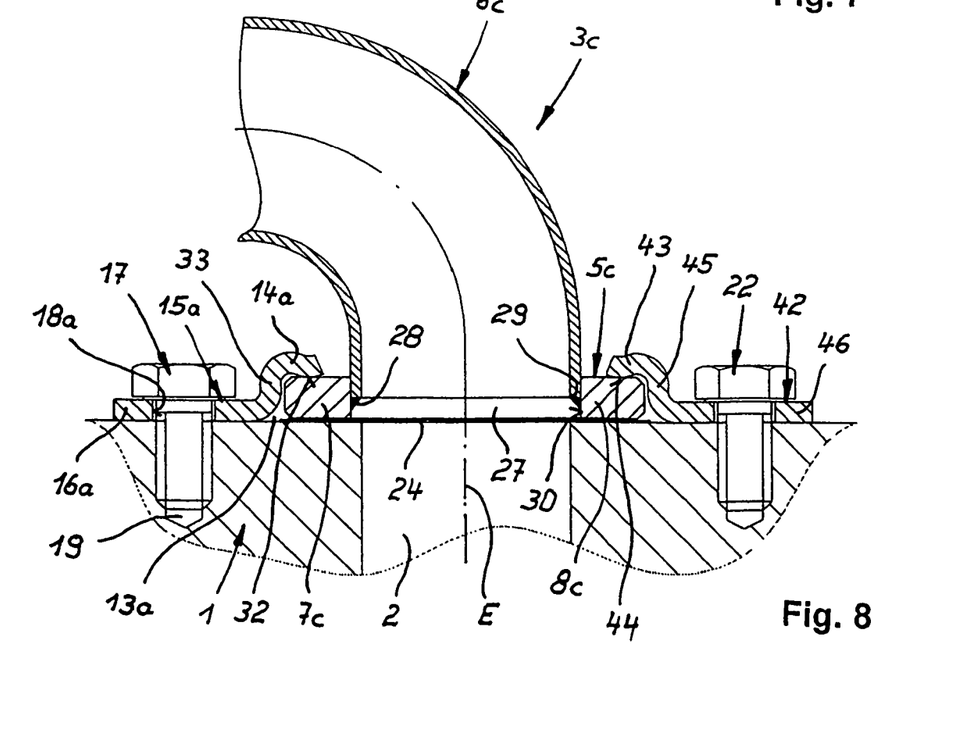
FIG. 8 shows the arrangement of FIG. 7 after assembly.

Subsequently, a mounting rail 42 having an S-shaped configuration is mounted to the top surface 4 of the cylinder head 1 by means of screw fasteners 22, thereby forming a spring-elastic contact between a shoulder 43, which extends in substantially parallel relationship to the top surface 4, and the longitudinal flange portion 8c of the head flange 5c. A downwardly arched convex area 44 is hereby in spring-elastic contact with the longitudinal flange portion 8c. A web 45, which connects the attachment leg 46 and the shoulder 43 of the mounting rail 42, imparts the shoulder 43 with a certain resilient elasticity. After tightening the screw fasteners 22, the exhaust manifold 3c is securely fixed to the cylinder head 1 while the gasket is compressed.

While the invention has been illustrated and described as embodied in a method of making an exhaust gas collector, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. In combination,
   an exhaust manifold having a head flange constructed for receiving at least two exhaust pipes arranged side-by-side, and spaced apart first and second longitudinal flange portions;
   a mounting assembly for sealingly securing the exhaust manifold to a cylinder head of an internal combustion engine, said mounting assembly including a mounting rail constructed to lap over the first longitudinal flange portion of the head flange and contacting the first longitudinal flange portion in a spring-elastic manner, and plural screw fasteners for at least indirectly clamping the second longitudinal flange portion to the cylinder head; and
   a seal arranged between the head flange and the cylinder head,
   wherein the first longitudinal flange portion of the head flange has an S-shape configuration, said mounting rail having an L-shaped configuration with a shoulder disposed in substantial parallel relationship to a top surface of the cylinder head and lapping over the S-shaped first longitudinal flange portion, wherein the second longitudinal flange portion of the head flange has a flat configuration and is formed with bores for direct securement of the second longitudinal flange portion to the cylinder head by means of the screw fasteners.

2. The combination of claim 1, wherein the L-shaped mounting rail has an attachment leg for securement to the top surface of the cylinder head by screw bolts, said shoulder jutting out from the attachment leg at a right angle.

3. The combination of claim 1, wherein the head flange is made from a sheet metal blank by a deep-drawing process.

4. The combination of claim 1, wherein the head flange has a thickness which is smaller than a thickness of the mounting rail.

5. The combination of claim 1, wherein the shoulder is spaced from the top surface by a distance which is greater than a thickness of the head flange.

6. The combination of claim 1, wherein the second longitudinal flange portion of the head flange has a terminal edge extending perpendicular to a top surface of the cylinder head.

7. The combination of claim 1, wherein the exhaust manifold has a plurality of collars provided between the first and second longitudinal flanges portions for receiving the exhaust pipes, whereby the collars and the exhaust pipes are placed in one-to-one correspondence.

8. The combination of claim 1, wherein the exhaust manifold has a plurality of openings provided between the first and second longitudinal flanges portions for receiving the exhaust pipes, whereby the openings and the exhaust pipes are placed in one-to-one correspondence.

9. The combination of claim 1, wherein the seal is configured as single-layer gasket or multi-layer gasket.

10. In combination,
    an exhaust manifold having a head flange constructed for receiving at least two exhaust pipes arranged side-by-side, and spaced apart first and second longitudinal flange portions;
    a mounting assembly for sealing securing the exhaust manifold to a cylinder head of an internal combustion engine, said mounting assembly including a mounting rail constructed to lap over the first longitudinal flange portion of the head flange and contacting the first longitudinal flange portion in a spring-elastic manner, and plural screw fasteners for at least indirectly clamping the second longitudinal flange portion to the cylinder head; and
    a seal arranged between the head flange and the cylinder head,
    wherein the first and second longitudinal flanges portions have each an S-shape configuration, said mounting rail having an L-shaped configuration with a shoulder disposed in substantial parallel relationship to a top surface of the cylinder head and lapping over the S-shaped first longitudinal flange portion, said mounting assembly including a further L-shaped rail having a shoulder disposed in substantial parallel relationship to a top surface of the cylinder head and lapping over the S-shaped second longitudinal flange portion.

11. The combination of claim 10, wherein the L-shaped mounting rail has an attachment leg for securement to the top surface of the cylinder head by screw bolts, said shoulder jutting out 1mm the attachment leg at a right angle.

12. The combination of claim 10, wherein the head flange is made from a sheet metal blank by a deep-drawing process.

13. The combination of claim 10, wherein the head flange has a thickness which is smaller than a thickness of the mounting rail.

14. The combination of claim 10, wherein the second longitudinal flange portion of the head flange has a terminal edge extending perpendicular to a top surface of the cylinder head.

15. The combination of claim 10, wherein the exhaust manifold has a plurality of collars provided between the first and second longitudinal flanges portions for receiving the exhaust pipes, whereby the collars and the exhaust pipes are placed in one-to-one correspondence.

16. The combination of claim 10, wherein the exhaust manifold has a plurality of openings provided between the first and second longitudinal flanges portions for receiving the exhaust pipes, whereby the openings and the exhaust pipes are placed in one-to-one correspondence.

17. The combination of claim 10, wherein the seal is configured as single-layer gasket or multi-layer gasket.

18. In combination,
    an exhaust manifold having a head flange constructed for receiving at least two exhaust pipes arranged side-by-side, and spaced apart first and second longitudinal flange portions;
    a mounting assembly for sealingly securing the exhaust manifold to a cylinder head of an internal combustion engine, said mounting assembly including a mounting rail constructed to lap over the first longitudinal flange portion of the head flange and contacting the first longitudinal flange portion in a spring-elastic manner, and plural screw fasteners for at least indirectly clamping the second longitudinal flange portion to the cylinder head; and
    a seal arranged between the head flange and the cylinder head, wherein the first longitudinal flange portion of the head flange has a planar configuration, said mounting rail having an S-shape configuration and including a shoulder disposed in substantial parallel relationship to a top surface of the cylinder head and lapping over the first longitudinal flange portion, said second longitudinal flange portion of the head flange having bores for receiving the screw fasteners for direct securement to the cylinder head.

19. The combination of claim 18, wherein the shoulder of the mounting rail is arched slightly convex in the direction of the top surface.

20. The combination of claim 18, wherein the mounting rail has a thickness which is about half a thickness of the head flange.

21. The combination of claim 18, wherein the L-shaped mounting rail has an attachment leg for securement to the top surface of the cylinder head by screw bolts, said shoulder jutting out from the attachment leg at a right angle.

22. The combination of claim 18, wherein the head flange is made from a sheet metal blank by a deep-drawing process.

23. The combination of claim 18, wherein the head flange has a thickness which is smaller than a thickness of the mounting rail.

24. The combination of claim 18, wherein the second longitudinal flange portion of the head flange has a terminal edge extending perpendicular to a top surface of the cylinder head.

25. The combination of claim 18, wherein the exhaust manifold has a plurality of collars provided between the first and second longitudinal flanges portions for receiving the exhaust pipes, whereby the collars and the exhaust pipes are placed in one-to-one correspondence.

26. The combination of claim 18, wherein the exhaust manifold has a plurality of openings provided between the first and second longitudinal flanges portions for receiving the exhaust pipes, whereby the openings and the exhaust pipes are placed in one-to-one correspondence.

27. The combination of claim 18, wherein the seal is configured as single-layer gasket or multi-layer gasket.

28. In combination,
an exhaust manifold having a head flange constructed for receiving at least two exhaust pipes arranged side-by-side, and spaced apart first and second longitude flange portions;
a mounting assembly for sealingly securing the exhaust manifold to a cylinder head of an internal combustion engine, said mounting assembly including a mounting rail constructed to lap over the first longitudinal flange portion of the head flange and contacting the first longitudinal flange portion in a spring-elastic manner, and plural screw fasteners for at least indirectly clamping the second longitudinal flange portion to the cylinder head; and
a seal arranged between the head flange and the cylinder head,
wherein the first longitudinal flange portion of the head flange has a planar configuration, said mounting rail having an S-shape configuration and including a shoulder disposed in substantial parallel relationship to a top surface of the cylinder head and lapping over the first longitudinal flange portion, said mounting assembly including an S-shaped mounting rail having a shoulder disposed in substantial parallel relationship to a top surface of the cylinder head and lapping over the second longitudinal flange portion.

29. The combination of claim 28, wherein the shoulder of the mounting rail is arched slightly convex in the direction of the top surface.

30. The combination of claim 28, wherein the L-shaped mounting rail has an attachment leg for securement to the top surface of the cylinder head by screw bolts, said shoulder jutting out from the attachment leg at a right angle.

31. The combination of claim 28, wherein the head flange is made from a sheet metal blank by a deep-drawing process.

32. The combination of claim 28, wherein the head flange has a thickness which is smaller than a thickness of the mounting rail.

33. The combination of claim 28, wherein the second longitudinal flange portion of the head flange has a terminal edge extending perpendicular to a top surface of the cylinder head.

34. The combination of claim 28, wherein the exhaust manifold has a plurality of collars provided between the first and second longitudinal flanges portions for receiving the exhaust pipes, whereby the collars and the exhaust pipes are placed in one-to-one correspondence.

35. The combination of claim 28, wherein the exhaust manifold has a plurality of openings provided between the first and second longitudinal flanges portions for receiving the exhaust pipes, whereby the openings and the exhaust pipes are placed in one-to-one correspondence.

36. The combination of claim 28, wherein the seal is configured as single-layer gasket or multi-layer gasket.

* * * * *

UNITED STATES PATENT AND TRADEMARK OFFICE
CERTIFICATE OF CORRECTION

PATENT NO. : 7,185,490 B2
APPLICATION NO. : 11/069892
DATED : March 6, 2007
INVENTOR(S) : Christian Smatloch et al.

It is certified that error appears in the above-identified patent and that said Letters Patent is hereby corrected as shown below:

On the title page

Item (73) Assignee:

Replace "Benteler Automobil Technik GmbH" with --Benteler Automobiltechnik GmbH--.

In the claims, please correct the following error:

Col. 10, Claim 11, line 30 last line: replace "out 1 mm" with --out from--.

Signed and Sealed this

Seventeenth Day of July, 2007

JON W. DUDAS
*Director of the United States Patent and Trademark Office*